Aug. 26, 1958 J. M. EGLIN 2,849,537
REDUCTION OF QUADRATURE DISTORTION
Filed Dec. 30, 1952
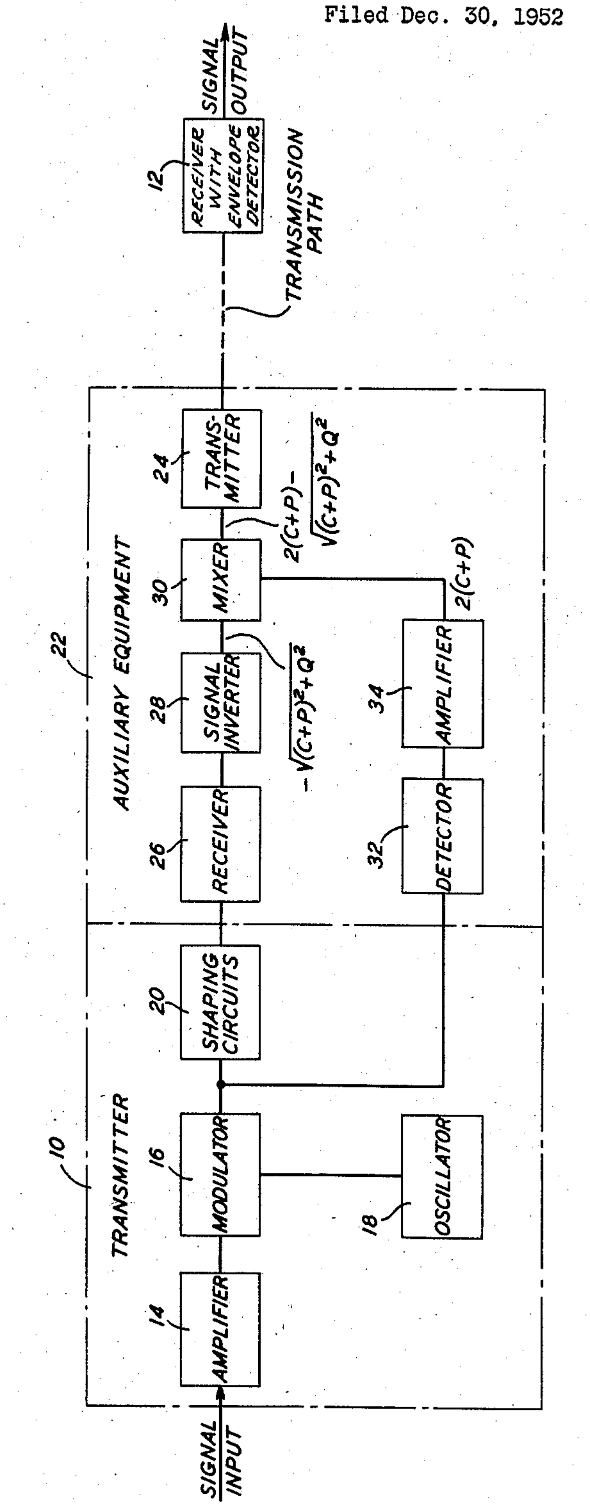
INVENTOR
J. M. EGLIN
BY
E. W. Adams Jr.
ATTORNEY REDUCTION OF QUADRATURE DISTORTION
Filed Dec. 30, 1952
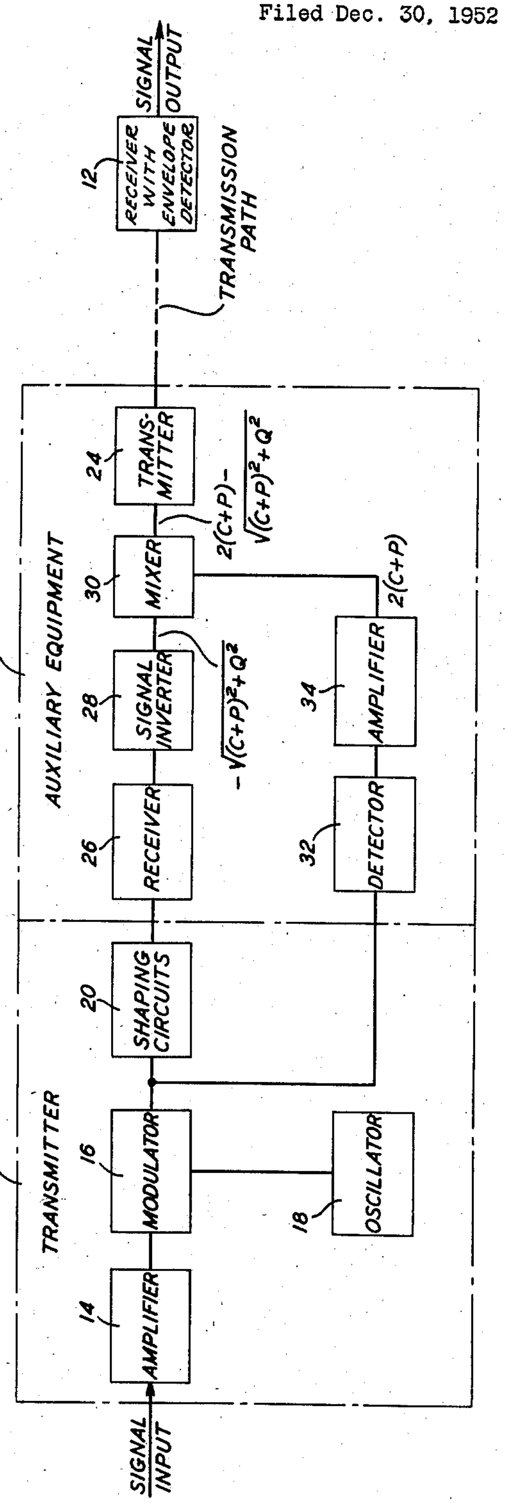
INVENTOR
J. M. EGLIN
BY
E. W. Adams Jr.
ATTORNEY 2,849,537
Patented Aug. 26, 1958

2,849,537

REDUCTION OF QUADRATURE DISTORTION

James M. Eglin, Glen Rock, N. J., assignor to Bell Telephone Laboratories, Incorporated, New York, N. Y., a corporation of New York Application December 30, 1952, Serial No. 328,663

8 Claims. (Cl. 179—15.5)

This invention relates to communication systems and more particularly to improvements in systems of the type in which the vestigial sideband method of transmission is employed.

The present invention is a modification of a system for reducing quadrature distortion in vestigial sideband systems employing envelope detection as described in the copending application of F. A. Cowan, Serial No. 328,785, filed on even date herewith. As is pointed out in that application the vestigial sideband method of transmission has found wide employment in the transmission of picture and television signals and other signals in which the signal information must include very low frequency or direct current components. This method of transmission makes possible an increased band width as to message signals at the expense of the introduction of various forms of distortion.

It has been found that the primary component of distortion arises from the fact that the transmission characteristic employed in the vestigial sideband systems is not symmetrical about the carrier frequency. The most commonly employed characteristic may be idealized, for example, as providing a transmission of an arbitrary value for all sideband frequencies exceeding the carrier frequency by at least an amount $f$ and falling linearly to zero transmission for all frequencies which are less than the carrier frequency by the same amount $f$. By reason of the fact that this characteristic is not symmetrical about the carrier frequency, a so-called quadrature distortion component is produced when a double sideband signal produced by the usual modulation processes is subjected to shaping circuits introducing this characteristic. Essentially this comprises a carrier which is in quadrature with the applied carrier modulated by signal components which are modified in amplitude and are in quadrature with the corresponding components of the message wave. The effect of such a distortion component is highly undesirable in television and picture signals and many attempts have been made to eliminate it.

As has been pointed out in the copending application referred to above, the quadrature component may be eliminated through the use of the homodyne system of detection. Where this type of detector is unsuitable however, an envelope detection must be used. The quadrature component represents an unwanted part of the demodulated wave which cannot readily be eliminated without markedly decreasing the efficiency or increasing band width or both of the system. In the copending application of Cowan a method was proposed for reducing the deleterious effects of quadrature distortion in vestigial sideband systems employing envelope detection. Essentially that arrangement involved the interposition of an auxiliary receiver, a signal inverter and an auxiliary transmitter between either the terminal transmitter or the terminal receiver and the transmission path of the system. It was shown that when such a predistorted signal was applied to the terminal receiver at least a portion of the undesired quadrature component was cancelled, thus effecting a considerable improvement in the overall fidelity of the transmission attainable in systems of this type.

The present invention has for its object the substantially complete elimination of the primary quadrature component from the demodulated wave appearing at the output of an envelope detector in a vestigial sideband system, In accordance with the invention a vestigial sideband system is provided in which, as in the case of the copending application referred to above, certain auxiliary apparatus is connected between one of the terminals and the transmission path joining them. In the present instance, an auxiliary circuit including an auxiliary receiver and a signal inverter is arranged to produce a signal component which is an inverted replica of the demodulated wave which would be obtained were the output of the terminal transmitter applied to and demodulated by the terminal receiver. A second auxiliary circuit comprising a detector is arranged to obtain from the modulator of the terminal transmitter a quantity proportional to the in-phase carrier and modulation component prior to action thereupon by the shaping circuits which introduce the vestigial sideband characteristic. The outputs of these two auxiliary circuits are combined in a mixer and applied to an auxiliary transmitter for transmission to the terminal receiver.

The above and other features of the invention will be described in detail in the following specification taken in connection with the drawing in which the single figure is a block schematic diagram of a vestigial sideband system embodying the invention.

As shown in the drawing a typical vestigial sideband system may include a terminal transmitter 10 and a terminal receiver 12 joined by a transmission path which may comprise either a wire or radio facility. The transmitter typically includes an input amplifier 14 and a modulator 16 to which the amplified input or message wave is applied together with the output of a local oscillator 18. The output wave obtained from modulator 16 includes both the carrier and upper and lower sidebands. When the vestigial sideband method of transmission is employed, this signal is applied to shaping circuits 20, the function of which is to substantially suppress one sideband except in the frequency range immediate adjacent the carrier frequency and to modify the transmission of the other sideband in a corresponding range on the other side of the carrier frequency to provide an overall characteristic approximate the idealized characteristic referred to above. Although shown at the transmitter, some or all of the shaping circuits may conveniently be located at the receiving end of the system. It is the presence of shaping circuits 20 which results in the introduction of a quadrature component into the output of transmitter 10. If, as is contemplated in accordance with the present invention, terminal receiver 12 is of the type in which envelope detection is employed the demodulated output wave is of the following form:

$$\sqrt{(C+P)^2+Q^2} \qquad (1)$$

where C identifies the in-phase carrier, P the desired in-phase modulating wave, and Q the unwanted quadrature component. In accordance with the invention this quadrature component is eliminated.

For the purpose of eliminating the quadrature term in the demodulated output wave auxiliary equipment 22 is provided which includes an auxiliary transmitter 24. This transmitter may conveniently be identical to transmitter 10 and in any event is arranged to operate at the same carrier frequency and to include shaping circuits providing the same overall transmisison characteristic as provided by shaping circuits 20 plus the transmission path. In accordance with the invention the output of transmitter 10 is acted upon to provide a predistorted input wave to be applied to auxiliary transmitter 24 as a modulating signal. This wave is so chosen that upon demodulation at terminal receiver 12 the quadrature component represented by the term $Q^2$ in Expression 1 above is substantially eliminated.

It has been found that this result can be accomplished by employing as modulating wave for the auxiliary transmitter a wave of the following form:

$$2(C+P)-\sqrt{(C+P)^2+Q^2} \qquad (2)$$

If such a wave is modulated upon a carrier and subjected to the idealized type of shaping considered above and thereafter demodulated by an envelope detector, the resultant demodulated wave is of the following form:

$$\sqrt{(C+P)^2-Q^2+\frac{Q^4}{4(C+P)^2}+Q^2-2QQ'+Q'^2}$$

It will be noted that this output wave includes two terms in $Q^2$ of opposite sign. These terms represent the primary quadrature distortion components and as a result the primary source of distortion is eliminated. However, the action of the shaping circuits of auxiliary transmitter 24 upon the quadrature component represented by Q in the second term Expression 2 results in the introduction of a secondary quadrature component $Q'$ into the demodulated output signal. If, however, the primary quadrature component is small with respect to $C+P$, the secondary component will be even smaller and the terms including $Q'$ and $Q'^2$ may be disregarded. Likewise the term in $Q^4$ being a small fraction and squared may likewise be neglected.

The auxiliary apparatus for obtaining the desired modulating wave for the auxiliary transmitter 24 includes an auxiliary receiver 26 which may conveniently be identical to terminal receiver 12. In any event this receiver employs envelope detection and produces an output of the form represented by Expression 1 above. This quantity is inverted in signal inverter 28 which may comprise a single stage amplifier or any other well-known type of phase inverter and is applied to a conventional mixer circuit 30. In addition the detector 32 is provided to obtain from the output of modulator 16 a quantity which is proportional to the sum of the in-phase carrier and in-phase modulating wave. Since the signal at this point has not passed through the shaping circuits 20 no quadrature component is present in the output of detector 32. An amplifier 34 is provided to raise the level of the detector output to obtain the quantity $2(C+P)$. This finally is combined with the output of signal inverter 28 in mixer 30 to obtain the desired modulating wave for auxiliary transmitter 24.

It will be understood that the desired form of modulating wave may be obtained by any convenient method from the output of terminal transmitter 10 and that when this type of modulating wave is employed the desired reduction or elimination of the quadrature distortion normally found in vestigial sideband systems of this type will be accomplished.

What is claimed is:

1. In a vestigial sideband system, a terminal transmitter including a modulator for producing vestigial sideband signals in response to a message wave to be transmitted, a terminal receiver including an envelope detector for recovering the message wave from said signals, a transmission channel joining said terminal transmitter and said terminal receiver, and means for reducing quadrature distortion in the reproduced wave comprising an auxiliary transmitter having characteristics similar to those of the terminal transmitter, means for obtaining from the output of said terminal transmitter a replica of the output wave normally produced in response thereto by said terminal receiver, means for producing from the output of said modulator a quantity proportional to the carrier and in-phase component only of the transmitter output, and means for inverting said replica and combining the resulting wave with said quantity for application to said auxiliary transmitter for transmission over said channel.

2. In a vestigial sideband system, a terminal transmitter including a modulator and a shaping circuit acting on the output thereof for producing vestigial sideband signals in response to a message wave to be transmitted, a terminal receiver including an envelope detector for reproducing the message wave from said signal, a transmission channel joining said terminal transmitter and said terminal receiver, and means for reducing quadrature distortion in the reproduced wave comprising an auxiliary transmitter having characteristics similar to those of said terminal transmitter, an auxiliary receiver having characteristics similar to those of said terminal receiver, means for obtaining from said terminal transmitter a quantity proportional to the output of said modulator, means for applying the output of said transmitter to said auxiliary receiver, and means for inverting the output of said auxiliary receiver and combining it with said quantity for application to said auxiliary transmitter for transmission over said channel.

3. In a vestigial sideband system, a terminal transmitter including a modulator for producing vestigial sideband signals in response to a message wave to be transmitted, a terminal receiver including an envelope detector for recovering the message wave from said signal, a transmission channel joining said terminal transmitter and terminal receiver and means for reducing quadrature distortion in the reproduced wave comprising an auxiliary transmitter having characteristics similar to those of said terminal transmitter, means for obtaining from the output of said terminal transmitter a first quantity proportional to the output normally produced by said terminal receiver in response thereto, means for producing from said modulator of said terminal transmitter a second quantity proportional to the carrier and in-phase component of the message signal only, a mixer, means for inverting said first quantity and applying it to said mixer together with said second quantity and means for applying the output of said mixer to said auxiliary transmitter for transmisison over said channel.

4. In a vestigial sideband system, a terminal transmitter including a modulator and a shaping circuit acting on the output thereof for producing vestigial sideband signals in response to a message wave to be transmitted, a terminal receiver including an envelope detector for recovering the message wave from said signal, a transmission channel joining said terminal transmitter and terminal receiver, and means for reducing quadrature distortion in the reproduced wave comprising an auxiliary transmitter, means for obtaining from the output of said terminal transmitter a first quantity proportional to the demodulated output normally produced by said terminal receiver in response thereto, a detector arranged to accept a portion of the output of said modulator, and means for applying the difference between said first quantity and the output of said detector to said auxiliary transmitter for transmission over said channel.

5. In a vestigial sideband system, a terminal transmitter including a modulator and a shaping circuit acting on the output thereof for producing vestigial sideband signals in response to a message wave to be transmitted, a terminal receiver including an envelope detector for recovering the message wave from said signal, a transmission channel joining said terminal transmitter and terminal receiver, and means for reducing quadrature distortion in the reproduced wave comprising an auxiliary transmitter having characteristics similar to those of said terminal transmitter, an auxiliary receiver having characteristics similar to those of said terminal receiver connected to the output of said terminal transmitter, means for inverting the output of said auxiliary receiver, a detector connected to the output of the modulator of said terminal transmitter, means for producing a modulating wave for said auxiliary transmitter which is proportional to the sum of the outputs of said detector and said inverter, and means for applying the output of said auxiliary transmitter to said channel.

6. In a vestigial sideband system, a transmitting terminal including a modulator for producing vestigial sideband signals in response to a message wave to be transmitted, a receiving terminal including an envelope detector for recovering the message wave from said signal, a transmission channel joining said terminal transmitter and terminal receiver, and means for reducing quadrature distortion in the reproduced wave comprising an auxiliary receiver connected to the output of the terminal transmitter and having characteristics similar to those of the terminal receiver, a mixer, means for inverting the output of the auxiliary receiver and applying it to said mixer, means for deriving from said modulator, a quantity proportional to the sum of the carrier and in-phase component of the signal and applying this quantity to said mixer, an auxiliary transmitter having characteristics similar to those in the terminal transmitter and means for applying the output of said mixer to said auxiliary transmitter for transmission over said channel.

7. In a vestigial sideband system, a terminal transmitter including a modulator for producing vestigial sideband signals in response to a message wave to be transmitted, a terminal receiver including an envelope detector for recovering the message wave from said signal, a transmission channel joining said terminal transmitter and terminal receiver and means for reducing quadrature distortion in the reproduced wave comprising means for obtaining from said message wave a wave proportional to the demodulated output of said terminal receiver in response thereto, means for obtaining also from said message wave a quantity proportional to the sum of the carrier employed at said terminal transmitter and the in-phase component produced by modulation by said message wave, and means for applying the difference between said quantities to said transmitter for transmission over said channel.

8. In a vestigial sideband system, a terminal transmitter including a modulator and shaping circuits connected at the output of said modulator for producing vestigial sideband signals in response to an applied message wave, a terminal receiver including an envelope detector for recovering the message wave from said signals, a transmission channel joining said terminal transmitter and terminal receiver, and means for reducing quadrature distortion in the recovered wave comprising an auxiliary receiver connected to the output of said shaping circuits and including an envelope detector similar to that of said terminal receiver, a mixer, means for inverting the output of said auxiliary receiver and applying it to said mixer, a detector, means for applying the output of said modulator thereto, means for applying the output of said detector to said mixer, an auxiliary transmitter connected to the output of said mixer and having shaping circuits similar to those of said terminal transmitter, and means for applying the output of said auxiliary transmitter to said channel.

References Cited in the file of this patent

UNITED STATES PATENTS

| | | |
|---|---|---|
| 2,516,587 | Peterson | July 25, 1950 |
| 2,566,698 | Frendendall | Sept. 4, 1951 |
| 2,666,133 | Kahn | Jan. 21, 1954 |